United States Patent [19]

Gillespie, III et al.

[11] Patent Number: 4,724,867
[45] Date of Patent: Feb. 16, 1988

[54] VACUUM CHECK VALVE

[75] Inventors: William H. Gillespie, III, Dayton; Donald L. Heffner, Miamisburg; David A. Homan, Centerville; Dennis G. Merical, Casstown; James W. Miller, Xenia; Donald L. Parker, Middletown, all of Ohio

[73] Assignee: General Motors Corporation, Detroit, Mich.

[21] Appl. No.: 909,738

[22] Filed: Sep. 19, 1986

[51] Int. Cl.⁴ ............................................. F16K 15/06
[52] U.S. Cl. .................................... 137/114; 137/526
[58] Field of Search ................................. 137/526, 514

[56] References Cited

U.S. PATENT DOCUMENTS 4,481,974  11/1984  Schmitt ............................. 137/514
4,628,959  12/1986  Parker .............................. 137/526

Primary Examiner—Robert G. Nilson
Attorney, Agent, or Firm—D. D. McGraw

[57] ABSTRACT

Resilient side loading of vacuum brake booster check valves to inhibit valve pulsations and resulting valve noises generated by pulsations from the vacuum source.

1 Claim, 2 Drawing Figures

VACUUM CHECK VALVE

The invention relates to a vacuum check valve and more particularly to such a valve used in the vacuum supply line as a control for a vacuum suspended brake booster supply. It is an improvement on the vacuum check valve of allowed application Ser. No. 771,219, entitled "Vacuum Check Valve" filed Aug. 30, 1985, now U.S. Pat. No. 4,628,959, issued Dec. 16, 1986 and assigned to the common assignee. The valve assembly embodying the invention herein disclosed and claimed inhibits pulsation of the valve member as the vacuum pressures change, thus inhibiting the generation of undesirable valve noises.

Vacuum check valves of the type disclosed in U.S. Pat. No. 3,086,544, entitled "Check Valve" and issued Apr. 23, 1963, have been used with vacuum suspended power brake boosters for many years. The typical valve construction has a valve element positioned in a valve chamber and made essentially of a washer and a rubber element. The valve is contained and guided within the chamber by the chamber side wall in relation to the outer periphery of the washer. A spring in the valve chamber urges the valve element toward engagement with an annular ridge which forms a valve seat around the point of entry of the inlet conduit into the valve chamber. Since air flow must pass around the valve when it is open, the guiding function of the chamber side wall permits some valve lateral movements so that the valve may not always be completely axially aligned with the valve seat. This loss presented no problem with small leaks that occasionally occur when used with larger engines. It has been found, as vehicle engines have been made smaller to achieve a higher fuel economy, less vacuum is availabe to operate various vehicle accessories than was the case with most vehicle engines when such check valves began to be used.

The improved vacuum check valve in which the invention is preferably incorporated is a guided poppet valve having a valve stem extending through valve housing guide means, The poppet valve is reinforced for improved sealability. The valve member seal which is engageable with the valve seat is made of a material which substantially eliminates cold weather sticking. It minimizes the formation of ice crystals between the valve seal and the valve seat so that leakage of air past the valve does not normally occur, even in extremely cold weather. The material is also of a type that has improved fuel resistance. By guiding the valve poppet with a valve stem located along the valve poppet axis, greater clearance is able to be maintained between outer periphery of the valve poppet and the adjacent inner wall of the valve housing, permitting much higher air flow rates which are subject to substantially less restriction to flow. At the same time, the valve is maintained in proper guided relation to the valve seat. In the improved valve herein claimed, valve member is laterally biased by a spring element to cause a slight drag force to be exerted on the valve member which is sufficient to inhibit valve member pulsations while permitting proper valve operation. Other advantages are set forth below.

IN THE DRAWINGS

Figure 1:
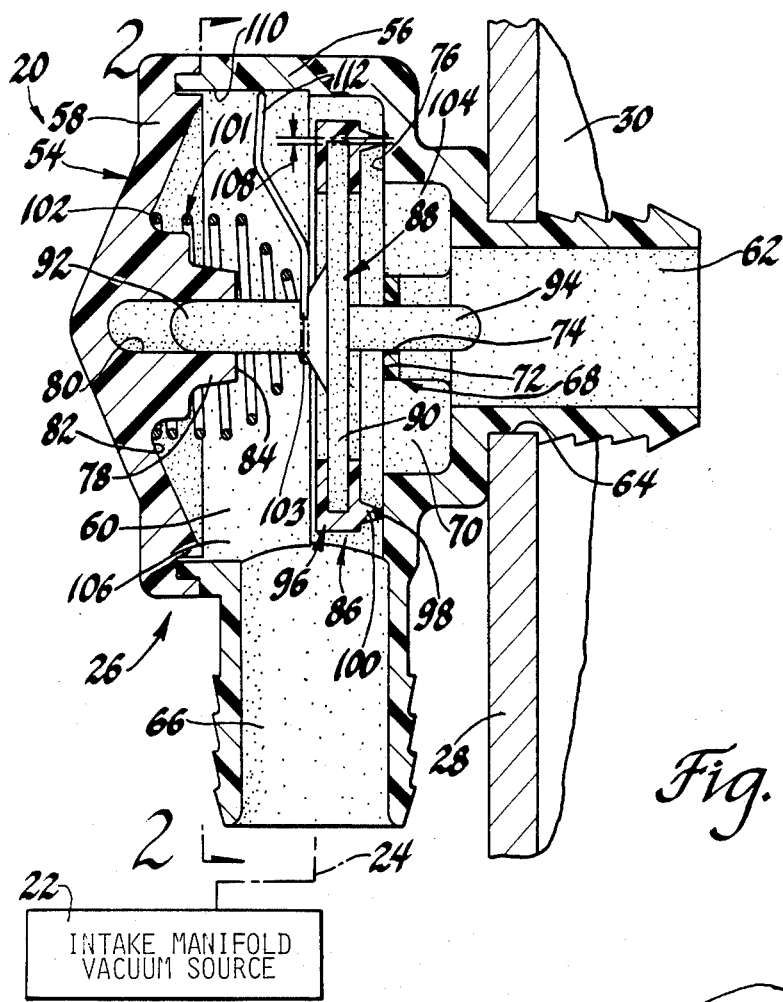
FIG. 1 is a cross-section view with parts broken away and illustrating a vacuum check valve having the claimed embodiment of the invention.

The system 20 shown in FIG. 1 includes an engine intake manifold 22. As is well known, the intake manifold of an internal combustion engine is commonly used as a source of vacuum to supply vacuum pressure to certain accessories. A suitable connection 24 is provided to tap into the intake manifold and obtain vacuum therefrom.

A vacuum suspended brake booster servomotor may be the device with which a check valve embodying the invention is used, as more fully disclosed in the above noted patents. The servomotor has a vacuum check valve assembly 26 mounted on the servomotor housing front section 28 and opening at one side into the servomotor vacuum chamber 30. The other side of the vacuum check valve assembly 26 is connected by the vacuum connection 24 to the intake manifold vacuum source 22.

An example of the servomotor, with a more detailed description of its operation, is found in U.S. Pat. No. 3,249,021, issued May 3, 1966 and entitled "Power Brake Booster".

The vacuum check valve assembly 26 of FIG. 1 includes a housing 54 formed of housing sections 56 and 58. Housing section 58 is sealingly secured to housing section 56 somewhat like a cover and cooperates with housing section 56 to define a valve chamber 60. An inlet 62 is integrally formed with housing section 56. The inlet is constructed to also provide means to secure the valve assembly to the housing front section 28 through a booster housing front section opening 64 in sealing relation. An outlet 66 is also formed as a part of housing section 56 and is arranged to receive vacuum connection 24 in sealing relation to provide communication between the valve outlet 66 and the vacuum source 22. The inlet and outlet passages respectively defined by inlet 62 and outlet 66 each connect with the valve chamber 60. Housing section 56 also has a web 68 formed therein over the passage formed by inlet 62, the web being provided with web openings 70 which provide a substantially unrestricted fluid flow connection from the inlet 62 into the valve chamber 60. Web 68 has a center part 72 which is in axial alignment with the inlet 62. An opening 74 is formed axially through the web center part 72 so that the web center part forms a guide for the valve member to be described. An annular valve seat 76 is defined by a surface formed as a part of housing section 56 and generally defining an end wall of the valve chamber 60 together with web 68. The surface of web center part 72 facing toward the main portion of the valve chamber 60 may be a planar extension of the surface defining the annular valve seat 76.

Valve housing section 58 is provided with a boss 78 extending into the valve chamber 60. Boss 78 has recessed opening 80 formed therein and opening into the valve chamber 60. Opening 80 is in axially spaced alignment with the web opening 74. Boss 78 has a spring seat 82 formed around its base and providing a spring seat for the valve spring to be described. The end 84 of boss 78 terminates in spaced relation to the web center part 72. Recessed opening 80 also acts as a guide for a portion of the valve member to be described.

The check valve member 86 is a poppet type of check valve and is contained within the valve chamber 60. Valve member 86 has a rigid valve member body 88 formed to include a disc-like center section 90 and a valve stem arrangement defined by a first valve stem portion 92 extending axially from one side of the center section 90 and forming a first guided valve portion which is reciprocably received and guided by recessed opening 80 of housing section 58. The stem arrangement includes a second valve stem portion 94 extending axially from the other side of the valve member center section 90 and forming a second guided valve portion. Valve stem portion 94 extends through the web opening 74 for guided reciprocal movement therein. One of the valve stem portions is larger in diameter than the other, and thesame is true of the openings 74 and 80, thereby preventing the valve member 86 from being accidentally assembled in the axially reversed position from that desired. For this purpose it is preferred that the valve stem portion 94 and web opening 74 have a smaller diameter than that of the valve stem portion 92 and the recessed opening 80. Since the usual manner of assembly of the valve in the housing would be to first insert stem portion 94 through web opening 74, it is clear that the larger valve stem portion 92 could not be so inserted because web opening 74 is smaller in diameter than that valve stem portion. This effectively prevents misassembly of the valve member in the housing.

Valve member 86 has a valve member seal 96 secured to the peripheral portion of the disc-like center section 90 of the valve body 88. One side of the annular valve member seal 96 has a valve seat-engageable surface 98. Seat-engageable surface 98 is the outer end of a circumferentially formed valve member bead 100 which extends axially from the main part of the valve member seal 96 so as to be engageable with the annular valve seat 76 of housing section 56. A compression coil valve spring 101 is received in valve chamber 60 and has one spring end 102 engaging spring seat 82 and another part 103 adjacent the other spring end and engaging one side of the valve member body 88 so that the valve member 86 is continually urged toward surface sealing engagement with the annular valve seat 76. Valve spring 101 is so proportioned, and the axial distance between the end 84 of boss 78 relative to the facing surace of the valve member body 88 is such, that the valve member body may move against the force of the spring 101 to fully open the valve by separating the valve member bead 100 from the annular valve seat 76 a sufficient axial distance to provide substantially no flow restriction past the bead and valve seat. At the same time, stem 94 remains guided within the web opening 74 and valve stem 92 moves further into the recessed opening 80. The rigid valve member body 88 extends radially outward so that it is axially aligned with the major portion of the valve member bead 100 to provide reinforcement for the entire valve member seal 96 and axial stability for the valve member bead 100, thereby insuring planar sealing action of the bead 100 with the valve seat 76. The guiding action of openings 74 and 80 on stem portions 94 and 92, respectively, further assure the maintenance of the sealing surface of the valve member seal 96 in parallel planar relation with the valve seat 76 at all times.

When the valve member bead 100 is in sealing engagement with seat 76 as shown in FIG. 1, the valve chamber 60 is separated into a chamber inlet section 104 and a chamber outlet section 106. Chamber inlet section 104 is in fluid communication with the inlet 62 so that the entire surface area of the valve member 86 positioned radially inward of the seat engageable surface 98 is exposed to pressure within inlet 62 and therefore the pressure in the vacuum chamber 30 of the booster 28. The chamber outlet section 106 is in full fluid communication with the outlet 66 at all times, and the pressure therein is the pressure being transmitted to the check valve assembly 26 from the engine vacuum source 22 through vacuum connection 24. This pressure also acts on the valve member 86 across the same effective surface as that described immediately above for the inlet pressure. It also acts on the small annular seat engaging surface area 108 which is defined by the area through which surface 98 is in surface engagement with the annular valve seat 76. Therefore the pressure acting on valve member 86 and contained within chamber outlet section 106 acts over a slightly larger effective area than does the inlet pressure acting in the chamber inlet section 104 on the effective area of valve member 86. This difference in effective areas is maintained at a minimal amount by keeping the area of surface 108 to a minimal amount. The minimal contact area is also important in preventing the valve from sticking during extremely cold conditions, as will be further described.

Figure 2:
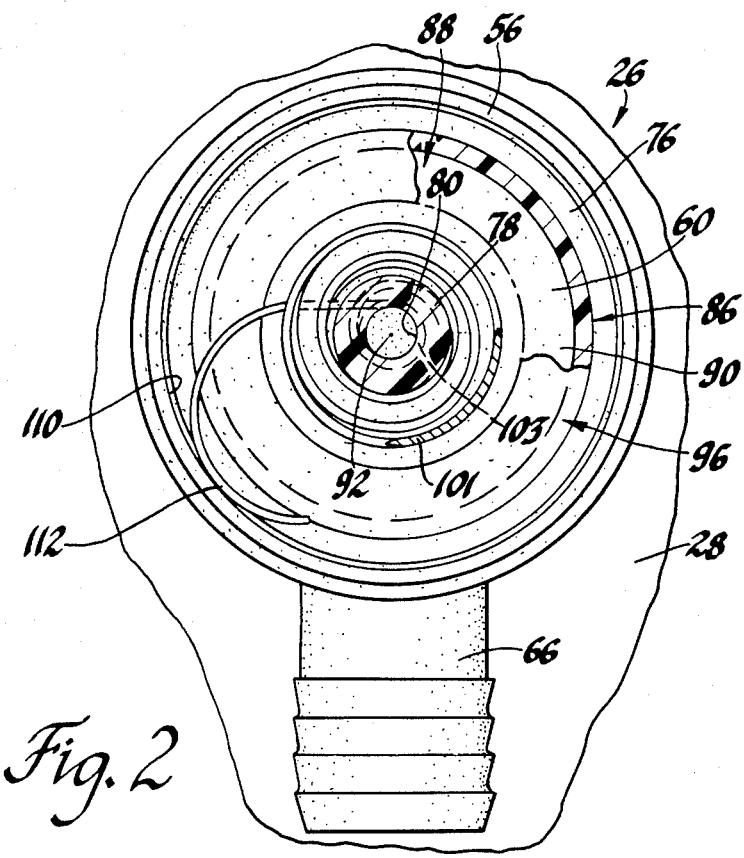
FIG. 2 is a fragmentary cross-section view, with parts broken away, illustrating the vacuum check valve of FIG. 1 taken in the direction of arrows 2—2 of that figure.

The valve member seal 96 of the construction shown in FIGS. 1 and 2 is preferably molded in place on the valve member body. It has been found that it is also preferable to make the valve member seal from a fluoro-silicone rubber for improved fuel vapor resistance and minimization of cold weather sticking. The material should have a durometer of about 40 to 50 at a standard temperature of 70° F., and should increase in durometer with a decrease in ambient temperature to no more than about 60 to 70 durometer at about minus 20° F. This will not only substantially eliminate cold weather sticking of the valve seal to the valve seat under cold weather conditions, but will also maintain good sealing characteristics throughout the range of temperatures normally encountered in vehicles, such a temperature range being from as high as about 280° F. in the engine compartment in which the valve is normally located to as low as about minus 40° F.

By arranging the valve member so that it is guided and supported axially, greater clearance around the outer periphery of the valve member in relation to the valve housing is permitted so to minimize flow restriction in that area. It is preferred that the annular area defined by the outer periphery of the valve member and the portion of the valve housing which is radially outward of the valve member outer periphery be at least as great as the effective cross-section area of the inlet port formed by inlet 62. This assures a substantially unrestricted air flow past the outer periphery of the valve member when the valve assembly is open. A considerably greater air flow may be obtained through the valve than has heretofore been the case. This therefore leads to an increase in the size of vacuum hose such as vacuum connection hose 24, as well as the sizes of the inlet 62 and the outlet 66, to take full advantage of the decrease in restriction to flow in the valve itself. This has resulted in substantially less pressure drop in relation to flow rate, minimizing the amount of time required to reestablish the desired vacuum pressure in the vacuum chamber of the brake booster during or after booster operation. At the same time, the average differential pressure for opening the vacuum check valve is maintained at less than one inch of mercury. Where the average flow restriction at a flow rate of 500 cubic feet per hour of air through the valve has previously been in the range of about 18 to 28 inches of mercury, the valve as shown in FIGS. 1 and 2 has an average flow restriction at this flow rate of less than 3 inches of mercury. The valve has also minimized the amount of leakage when the valve is supposed to be fully closed. It has been equal to the best of valves in current production at moderately high temperatures. For example, at 212° F., tests have indicated that no leakage has occurred, while on some production units, as much as 20% of the valves will have some leakage at this temperature. It has considerably decreased the valve leakage at cold temperatures, as well as valve sticking under cold temperatures. For example, the illustrated valve had no leaks and did not stick at 0° F. The valve also showed dramatic improvement in leakage and potential failure with a pressure differential thereacross as small as 2 inches of mercury and up to 20 inches of mercury, in comparison to various valves used by different manufacturers.

It has been found that in some installations the valve of U.S. Pat. No. 4,628,959, referred to above, would pulsate and generate disagreeable valve noises. Experience indicated that this has occurred when used with some engines but not with others. Therefore it is an object of the invention herein disclosed and claimed to inhibit such pulsations and therefore inhibit the generation of such undesirable valve noises. A preferred embodiment is illustrated in FIGS. 1 and 2. In this embodiment, spring 101 has been modified in relation to the similar spring in the above identified U.S. Pat. No. 4,628,959. In stead of having a spring end engaging the valve member body in the area of where valve stem 92 connects with the valve disc-like section 90, the spring end is extended in a laterally outward manner and also arcuately so that it engages the side wall 110 of valve chamber 60 and laterally spring biases the valve member 86 so as to provide a slight drag force on the valve stems 92 and 94 as they are guided by the guide openings 74 and 80. This drag resistance to movement is sufficient to inhibit pulsating movements of the valve member 86 without adversely affecting its normal function as a check valve as described above. The arcuately curved spring end 112 is illustrated in FIG. 2 to show the resilient biasing arrangement of the spring. This spring end 112 may be referred to as a spring element. While it preferable, because of simplicity, to form it as an integral part of spring 101, it could be a separately formed element so long as it fit over the valve stem 92.

The illustrated and claimed preferred embodiment of the invention provides an arrangement which effectively inhibits valve pulsations when they are likely to occur because of pressure differential changes at either the inlet or outlet port or both, and therefore inhibits undesirable valve noises generated as a result of such pulsations.

The embodiments of the invention in which an exclusive property or privilege is claimed are defined as follows:

1. A vacuum check valve assembly for controlling vacuum fluid pressure in a container, said check valve assembly comprising:

a housing, a valve chamber in said housing defined by opposed end walls and a side wall formed as a part of said housing, an inlet port and an outlet port formed in said housing and respectively opening through different ones of said walls so as to be in fluid communication with said valve chamber, said inlet port being adapted to be connected to a container in which vacuum fluid pressure is to be normally retained and said outlet port being adapted to be connected to a source of vacuum fluid pressure, an annular valve seat formed as a part of one of said housing end walls about said inlet port, a valve member movably mounted in said valve chamber and having a disc-like valve section in radially inwardly spaced relation to said chamber side wall, said valve member further having valve stem means extending axially from said disc-like valve section, said housing having valve stem-receiving guide means formed in said opposed end walls limitng the movements of said valve member to movements axially of said valve stem means and said disc-like valve section and toward and away from said annular valve seat to close said inlet port in one position and to open said inlet port and permit fluid flow around said disc-like valve section through said valve chamber and into said outlet port, a valve spring axially biasing said valve member toward said annular valve seat, and a spring element operatively resiliently and laterally engaging said valve member and said housing and continuously biasing said valve member laterally, said spring element being an outwardly and arcuately extending end of said valve spring extending arcuately outward from its engagement with said valve member and engaging said chamber side wall in spring biasing relation causing said valve stem means to drag and resist movements of said valve member and thus preventing undesired valve member pulsing movements and consequent valve member-generated noises during pulse-like changes of fluid pressure at at least one of said inlet and outlet ports.

* * * * *